(12) United States Patent
Olkin

(10) Patent No.: US 10,289,672 B1
(45) Date of Patent: May 14, 2019

(54) THREADING SPREADSHEET CALCULATIONS

(71) Applicant: Workday, Inc., Pleasanton, CA (US)

(72) Inventor: Terry M. Olkin, Niwot, CO (US)

(73) Assignee: Workday, Inc., Pleasanton, CA (US)

( * ) Notice: Subject to any disclaimer, the term of this patent is extended or adjusted under 35 U.S.C. 154(b) by 171 days.

(21) Appl. No.: 14/977,362

(22) Filed: Dec. 21, 2015

(51) Int. Cl.
  *G06F 17/10* (2006.01)
  *G06F 17/24* (2006.01)
  *G06F 17/27* (2006.01)
  *G06T 11/20* (2006.01)

(52) U.S. Cl.
  CPC ............ *G06F 17/246* (2013.01); *G06F 17/10* (2013.01); *G06F 17/27* (2013.01); *G06T 11/206* (2013.01)

(58) Field of Classification Search
  CPC ...................................................... G06F 17/246
  See application file for complete search history.

(56) References Cited

U.S. PATENT DOCUMENTS

| | | | | |
|---|---|---|---|---|
| 8,584,004 B2* | 11/2013 | Rae | ........................ | G06Q 40/04 715/219 |
| 9,158,832 B1* | 10/2015 | Hiatt | .................... | G06F 17/2247 |
| 2001/0056440 A1* | 12/2001 | Abramson | ............ | G06F 17/246 715/219 |
| 2006/0069993 A1* | 3/2006 | Jones | ...................... | G06F 9/505 715/212 |
| 2007/0260667 A1* | 11/2007 | Duzak | .................. | G06F 9/5066 708/521 |

* cited by examiner

*Primary Examiner* — Asher D Kells
(74) *Attorney, Agent, or Firm* — Van Pelt, Yi & James LLP

(57) ABSTRACT

A system for threading spreadsheet calculations includes an input interface and a processor. The input interface is to receive a request to perform spreadsheet calculations. The processor is to determine a data flow graph based at least in part on formulas of a spreadsheet, determine one or more spreadsheet threads based at least in part on the data flow graph, and indicate to execute the one or more spreadsheet threads to determine the spreadsheet calculation results.

21 Claims, 11 Drawing Sheets

|   | A | B | C | D | E | F |
|---|---|---|---|---|---|---|
| 1 | 22 | 75 | 100 | | | |
| 2 | 15 | | | | | |
| 3 | 48 | | | | | |
| 4 | 85 | | | | | |
| 5 | 75 | | | | | |

A1 = 22
A2 = 15
A3 = 48
A4 = SUM(A1:A3)
A5 = IF(A4 > B1, B1, C1)
B1 = 75
C1 = 100

Fig. 3

| Cell | Ready? | Dependent Cells |
|------|--------|-----------------|
| A1 | True | A4 |
| A2 | True | A4 |
| A3 | True | A4 |
| A4 | False | A5 |
| A5 | False | |
| B1 | True | A5 |
| C1 | True | A5 |

Fig. 5

THREADING SPREADSHEET CALCULATIONS

BACKGROUND OF THE INVENTION

A database system stores information including personnel information, financial information, technical information, etc. A spreadsheet application within a database system can be used for many data management tasks, including data organization, performing large calculations, etc. For some large data processing operations, the spreadsheet applications typically do not perform calculations in an efficient manner.

BRIEF DESCRIPTION OF THE DRAWINGS

Various embodiments of the invention are disclosed in the following detailed description and the accompanying drawings.

FIG. 3 is a diagram illustrating an embodiment of a spreadsheet.

FIG. 5 is a diagram illustrating an embodiment of a ready table.

DETAILED DESCRIPTION

Figure 1:
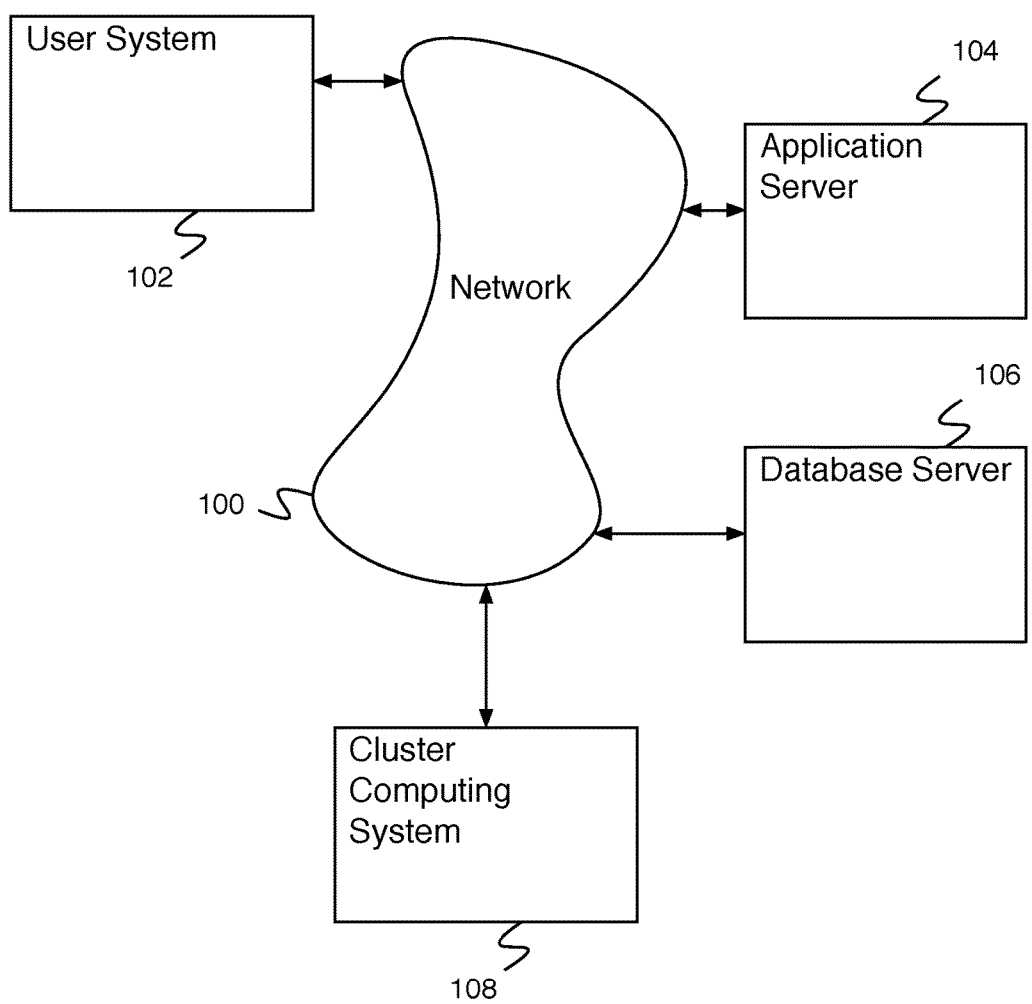
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A system for threading spreadsheet calculations comprises an input interface to receive a request to perform spreadsheet calculations and a processor to determine a data flow graph based at least in part on formulas of a spreadsheet, determine one or more spreadsheet threads based at least in part on the data flow graph, and indicate to execute the one or more spreadsheet threads to determine spreadsheet calculation results. In some embodiments, the system for threading spreadsheet calculations additionally comprises a memory coupled to the processor and configured to provide the processor with instructions.

In some embodiments, a system for threading spreadsheet calculations receives and analyzes a spreadsheet application in order to perform calculations efficiently on a parallel processing system. The system analyzes the spreadsheet to determine a data flow graph. The data flow graph comprises a directed acyclic graph describing the data flow paths of the spreadsheet calculations. The data flow graph can be followed starting at the leaf nodes. Computations of the leaf nodes of the graph can all occur in parallel, as none depend on each other. Computation of nodes of the graph that only depend on leaf nodes can then occur, followed by computation of nodes that depend only on the first two rounds of computation, etc. In this way a parallel processing resource, such as a cluster system, can be utilized as efficiently as possible.

FIG. 1 is a block diagram illustrating an embodiment of a network system. In some embodiments, the network system of FIG. 1 comprises a system for threading spreadsheet calculations. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. User system 102, application server 104, database server 106 and cluster computing system 108 communicate via network 100. User system 102 comprises a system for a user. In various embodiments, user system 102 comprises a system for a user to access applications on application server 104, to access data on database server 106, to create data structures on database system 106, to indicate removal of data structures on database system 106, or for any other appropriate purpose. In some embodiments, user system 102 comprises a processor and a memory. Application server 104 comprises a server for providing applications. In various embodiments, applications comprise database applications, accounting applications, spreadsheet applications, or any other appropriate applications. In some embodiments, application server 104 comprises a processor and a memory. Database system 106 comprises a system for managing a database. In some embodiments, database system 106 comprises a system for managing an object-oriented database. In some embodiments, database system 106 comprises a system for storing data provided by a user (e.g., via user system 102 and network 100). In some embodiments, database system 106 comprises a system for searching data. In some embodiments, database system 106 comprises a processor and a memory.

Figure 2:
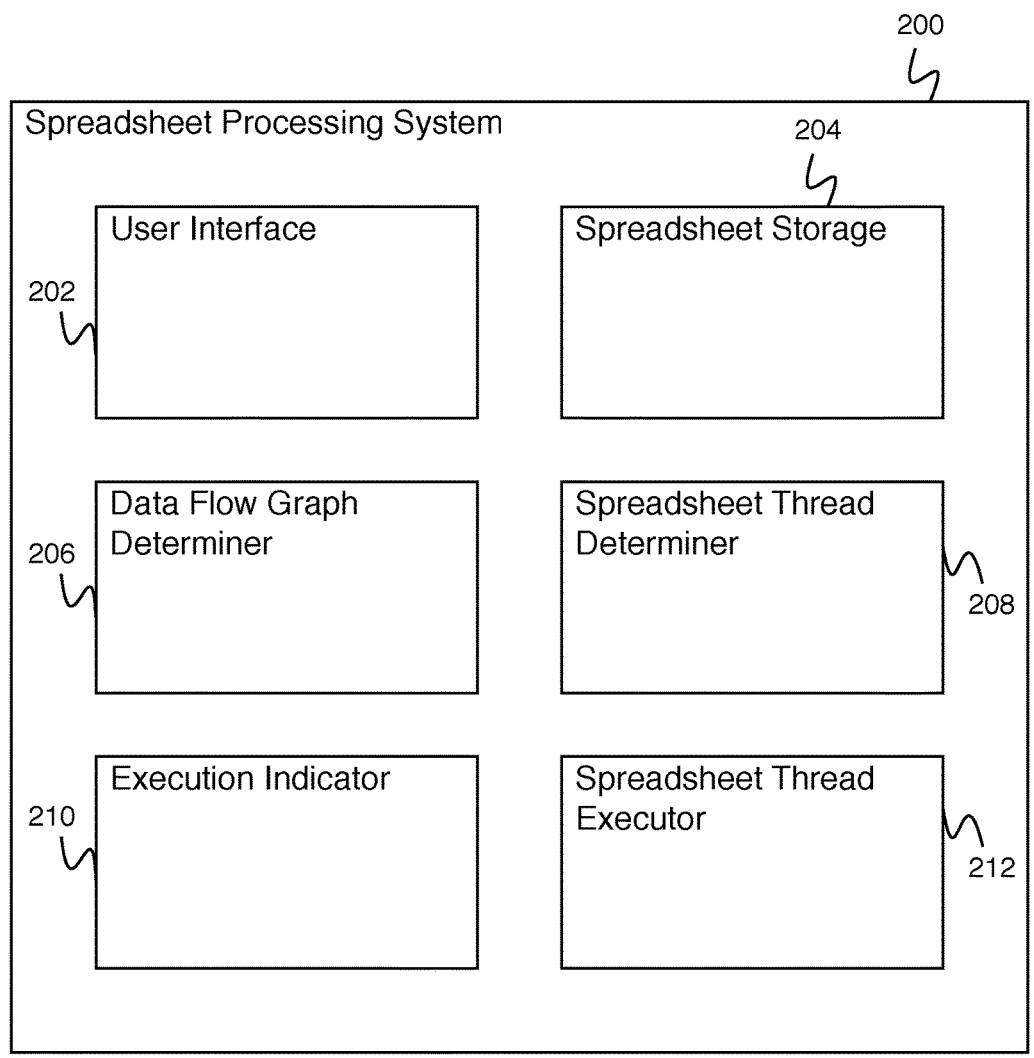
FIG. 2 is a block diagram illustrating an embodiment of a spreadsheet processing system.

FIG. 2 is a block diagram illustrating an embodiment of a spreadsheet processing system. In some embodiments, spreadsheet processing system 200 comprises a spreadsheet processing system implemented on a user system (e.g., user system 102 of FIG. 1). In some embodiments, spreadsheet processing system 200 comprises a spreadsheet processing system implemented on an application server (e.g., application server 104 of FIG. 1). In the example shown, spreadsheet processing system 200 comprises user interface 202. In various embodiments, user interface 202 comprises a user interface for receiving spreadsheet data, for receiving a request to perform spreadsheet calculations, for providing stored spreadsheet data, for providing spreadsheet calculation results, or for receiving or providing any other appropriate information. In some embodiments, user interface 202 is implemented using a processor. Spreadsheet processing system 200 comprises spreadsheet storage 204. In various embodiments, spreadsheet storage 204 comprises a spreadsheet storage for storing spreadsheet data, for storing spreadsheet formulas, for storing the results of spreadsheet calculations, for storing thread complete indications, or for storing any other appropriate information. In some embodiments, spreadsheet storage 204 is implemented using a processor. In some embodiments, spreadsheet storage 204 is implemented using a memory. In the example shown, spreadsheet processing system 200 comprises data flow graph determiner 206. In some embodiments, data flow graph determiner 206 determines a data flow graph based at least in part on spreadsheet data stored in spreadsheet storage 204. In some embodiments, a data flow graph describes the computational data flow associated with a spreadsheet. In some embodiments, data flow graph determiner 206 is implemented using a processor. Spreadsheet processing system 200 comprises spreadsheet thread determiner 208. In some embodiments, spreadsheet thread determiner 208 determines an executable thread for a spreadsheet computation. In some embodiments, spreadsheet thread determiner 208 determines a spreadsheet thread based at least in part on a data flow graph (e.g., on a data flow graph determined by data flow graph determiner 206). In some embodiments, spreadsheet thread determiner is implemented using a processor. Spreadsheet processing system 200 comprises execution indicator 210. In some embodiments, execution indicator 210 comprises an execution indicator for indicating a spreadsheet thread for execution. In some embodiments, execution indicator indicates a spreadsheet thread for execution by spreadsheet thread executor 212. In some embodiments, execution indicator 210 is implemented using a processor. In some embodiments, execution indicator indicates a spreadsheet thread for execution on a cluster computing system (e.g., cluster computing system 108 of FIG. 1). Spreadsheet thread executor 212 comprises a spreadsheet thread executor for executing a spreadsheet thread. In some embodiments, executing a spreadsheet thread comprises determining the result of a spreadsheet computation. In some embodiments, spreadsheet thread executor 212 is implemented using a processor. In various embodiments, the elements of spreadsheet processing system 200 are all implemented using a single processor, are each implemented using their own processor, or are combined onto a plurality of processors in any other appropriate way. In some embodiments, spreadsheet processing system 200 additionally comprises a memory coupled to one or more processors. In various embodiments, the memory comprises a magnetic memory, an optical memory, a solid-state memory, a flash memory, a non-volatile memory, a read-only memory, a tape memory, a disc memory, or any other appropriate memory.

FIG. 3 is a diagram illustrating an embodiment of a spreadsheet. In some embodiments, the spreadsheet of FIG. 3 comprises a spreadsheet stored by spreadsheet processing system 200 of FIG. 2 (e.g., in spreadsheet storage 204 of FIG. 2). In the example shown, the spreadsheet of FIG. 3 comprises a grid. Each grid cell can store either a constant value or a formula (e.g., a computation based on other grid cells). In the example shown, cell A1 stores the value 22, cell A2 stores the value 15, cell A3 stores the value 48, cell B1 stores the value 75, and cell C1 stores the value 100. Cell A4 stores the formula=SUM(A1:A3) (e.g., A4 is set equal to the sum of A1, A2, and A3). Cell A5 stores the formula=IF (A4>B1, B1, C1) (e.g., in the event A4 is determined to be greater than B1, A5 is set equal to B1, otherwise A5 is set equal to C1). Cell A5 is based in part on cell A4, which is based on cells A1, A2, and A3.

Figure 4:
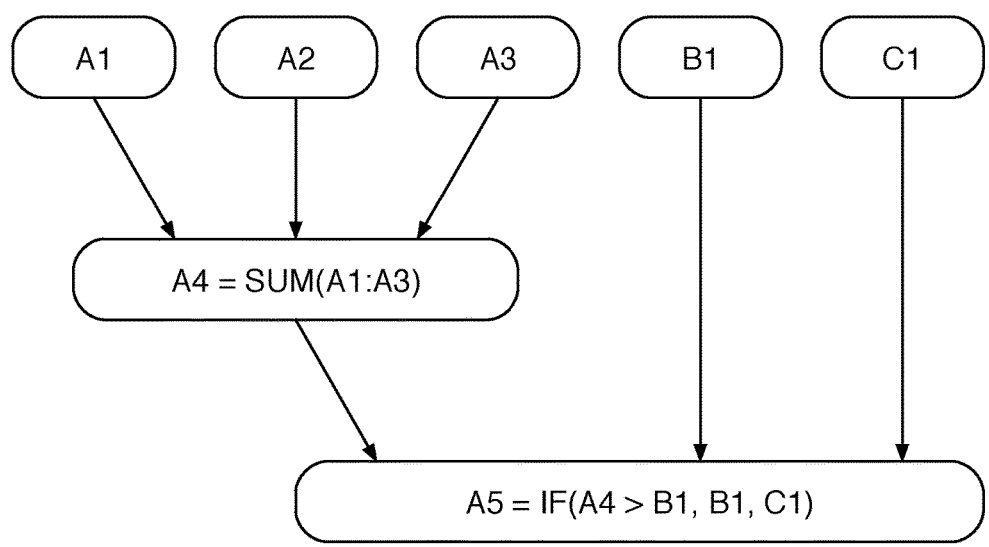
FIG. 4 is a diagram illustrating an embodiment of a data flow graph.

FIG. 4 is a diagram illustrating an embodiment of a data flow graph. In some embodiments, the data flow graph of FIG. 4 comprises the data flow graph representation of the spreadsheet of FIG. 3. In the example shown, a node of a data flow graph is associated with a cell of a spreadsheet. The data flow graph of FIG. 4 comprises leaf node A1, leaf node A2, leaf node A3, leaf node B1, and leaf node C1. In some embodiments leaf nodes are associated with spreadsheet cells comprising a constant value. In the example shown, arrows represent spreadsheet dependencies (e.g., if node A4 depends on node A1, an arrow points from node A1 to node A4). When determination of the value of a spreadsheet node is complete, dependent nodes are informed. In some embodiments, determination of the value of a node in the data flow graph is performed in a computation thread. A node that depends on multiple other nodes waits for all dependent nodes to complete their computations in order to begin computation. In the example shown, A4 depends on A1, A2, and A3. A5 depends on A4, B1, and C1.

FIG. 5 is a diagram illustrating an embodiment of a ready table. In some embodiments, a ready table comprises a ready table associated with a spreadsheet. In the example shown, the ready table of FIG. 5 comprises a ready table associated with the spreadsheet of FIG. 3. In the example shown, each cell of the associated spreadsheet is associated with a row of the ready table. The row associated with the cell comprises a column for the cell name, a column for a ready indication, and a column for a list of dependent cells. In some embodiments, a ready indication comprises a thread complete indication. In some embodiments, when a computation thread computing a value for a cell completes, the ready indication associated with the cell is marked as true. In some embodiments, when a computation thread computing a value for a cell completes, cells indicated in the list of dependent cells are informed that a cell they depend on is ready.

Figure 6:
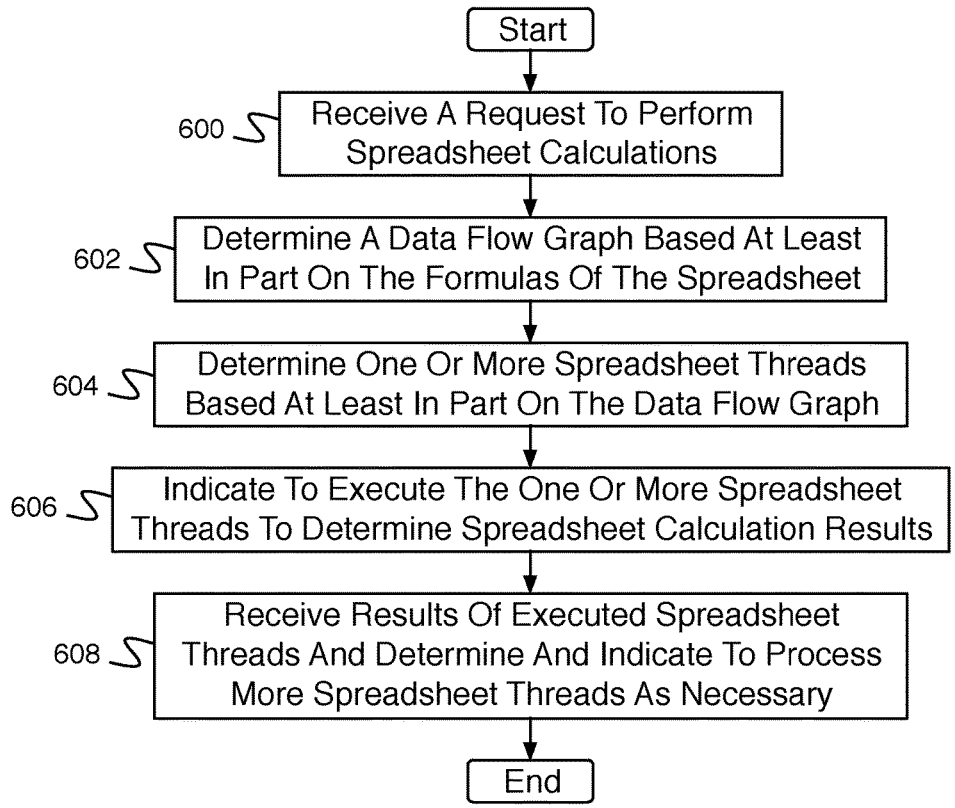
FIG. 6 is a flow diagram illustrating an embodiment of a process for threading spreadsheet calculations.

FIG. 6 is a flow diagram illustrating an embodiment of a process for threading spreadsheet calculations. In some embodiments, the process of FIG. 6 is implemented by spreadsheet processing system 200 of FIG. 2. In the example shown, in 600, a request to perform spreadsheet calculations is received. In various embodiments, a request to perform spreadsheet calculations comprises an update to a spreadsheet cell, a carriage return (e.g., indicating that an update to a spreadsheet cell is complete), an update sheet command, or any other appropriate request to perform spreadsheet calculations. In 602, a data flow graph is determined based at least in part on the formulas of the spreadsheet. In 604, one or more spreadsheet threads are determined based at least in part on the data flow graph. In some embodiments, the one or more spreadsheet threads comprise spreadsheet threads that are not dependent on the results of any other spreadsheet threads. In some embodiments, spreadsheet threads are performed hierarchically based at least in part on the data flow graph. In some embodiments, the one or more spreadsheet threads correspond to leaf nodes of the data flow graph. In 606, the one or more spreadsheet threads are indicated to be executed. In some embodiments, the one or more spreadsheet threads are indicated to be executed on cluster computing hardware. In some embodiments, the one or more spreadsheet threads are indicated to be executed in parallel. In some embodiments, execution of spreadsheet threads is performed in parallel for spreadsheet threads that are independent in the data flow graph. In some embodiments, spreadsheet calculation results are provided. In some embodiments, spreadsheet cells are updated with spreadsheet calculation results. In 608, the results of the executed spreadsheet threads are received, and more spreadsheet threads are determined and indicated to be processed as necessary. In some embodiments, in the event that no more spreadsheet threads are determined to be processed, spreadsheet calculation results are provided. In some embodiments, when no more spreadsheet threads are determined to be processed, spreadsheet cells are updated with spreadsheet calculation results.

Figure 7:
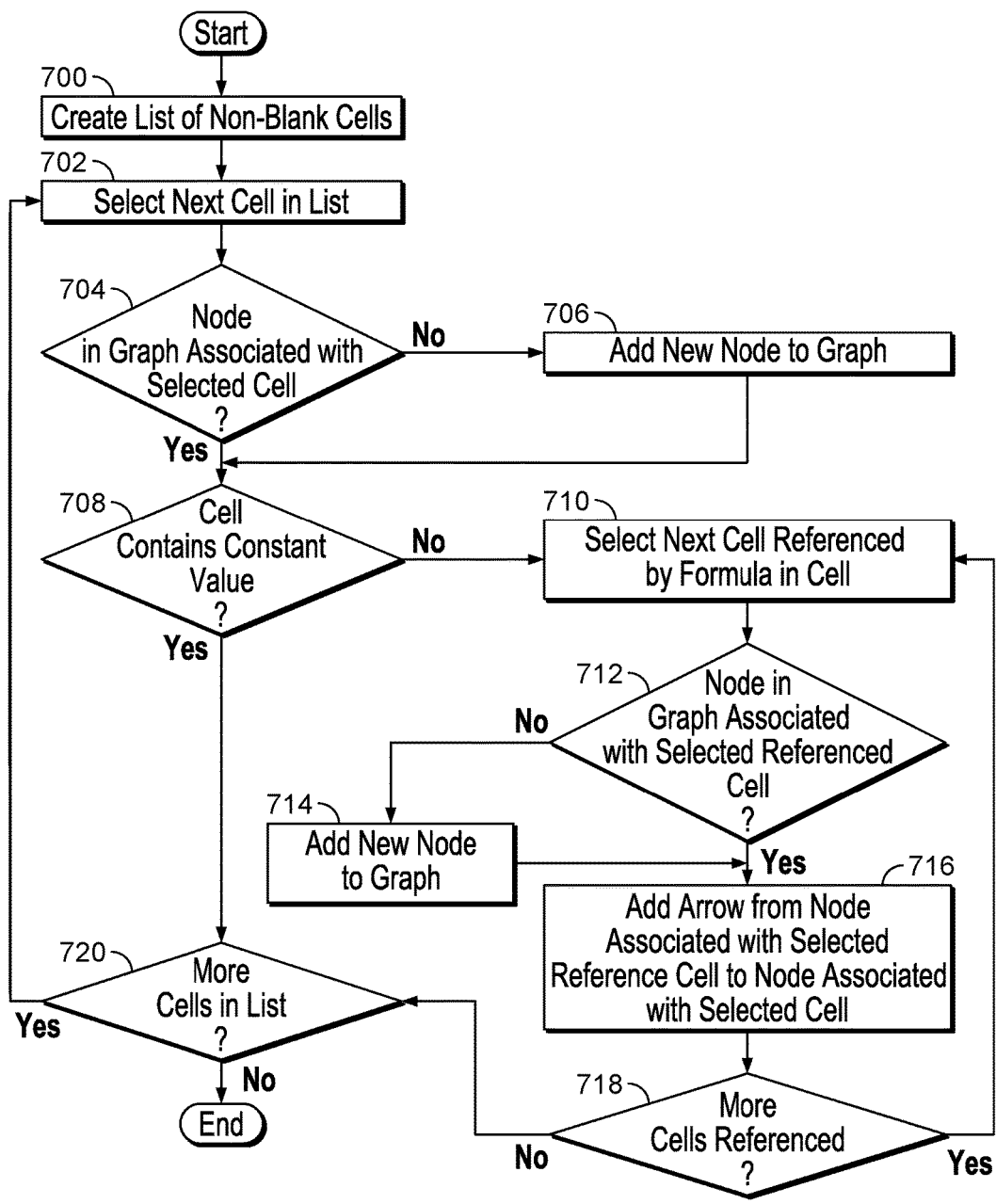
FIG. 7 is a flow diagram illustrating an embodiment of a process for determining a data flow graph based at least in part on formulas of a spreadsheet.

FIG. 7 is a flow diagram illustrating an embodiment of a process for determining a data flow graph based at least in part on formulas of a spreadsheet. In some embodiments, the process of FIG. 7 implements 602 of FIG. 6. In some embodiments, the data flow graph is determined at a compile time. In the example shown, in 700 a list of non-blank cells is created. For example, a list of all the non-blank cells on a sheet is created. In 702, a next cell in the list is selected. In 704, it is determined whether there is a node in the graph that is associated with the selected cell. In the event that there is not a node in the graph that is associated with the selected cell, then in 706 a new node is added to the graph and control passes to 708. In the event that there is a node in the graph that is associated with the selected cell, then in 708 it is determined whether the cell contains a constant value. For example, the cell does not contain a formula. In the event that the cell does not contain a constant value, then in 710 a next cell referenced by a formula in the cell is selected. In 712, it is determined whether there is a node in the graph associated with the selected referenced cell. In the event that there is not a node in the graph associated with the selected referenced cell, then in 714 a new node is added to the graph and control passes to 716. In the event that there is a node in the graph associated with the selected referenced cell, then in 716 an arrow is added from the node associated with the selected referenced cell to the node associated with the selected cell. In 718, it is determined whether there are more cells referenced. In the event that there are more cells referenced, then control passes to 710. In the event that there are not more cells referenced, then control passes to 720. In the event that the cell contains a constant value in 708, then control passes to 720. In 720, it is determined whether there are more cells in the list. In the event that there are no more cells in the list, then the process ends. In the event that there are more cells in the list, then control passes to 702.

Figure 8:
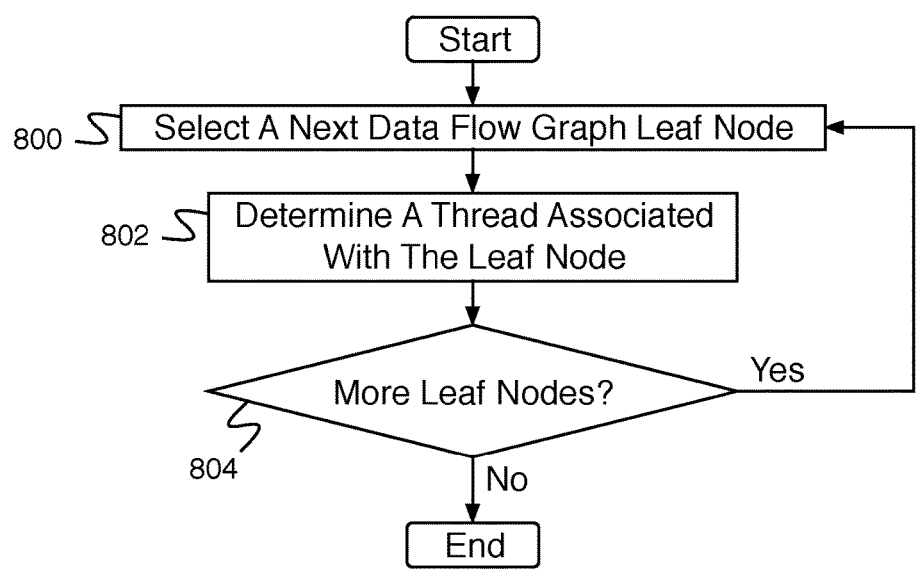
FIG. 8 is a flow diagram illustrating an embodiment of a process for determining one or more spreadsheet threads based at least in part on a data flow graph.

FIG. 8 is a flow diagram illustrating an embodiment of a process for determining one or more spreadsheet threads based at least in part on a data flow graph. In some embodiments, the process of FIG. 8 implements 604 of FIG. 6. In the example shown, in 800, a next data flow graph leaf node is selected. In some embodiments, the next data flow graph leaf node comprises the first data flow graph leaf node. In 802, a thread associated with the leaf node is determined. In some embodiments, determining a thread associated with the leaf node comprises determining a processing thread for computing the value of the leaf node. In 804, it is determined whether there are more leaf nodes in the data flow graph. In the event it is determined that there are more leaf nodes in the data flow graph, control passes to 800. In the event it is determined that there are not more leaf nodes in the data flow graph, the process ends.

Figure 9:
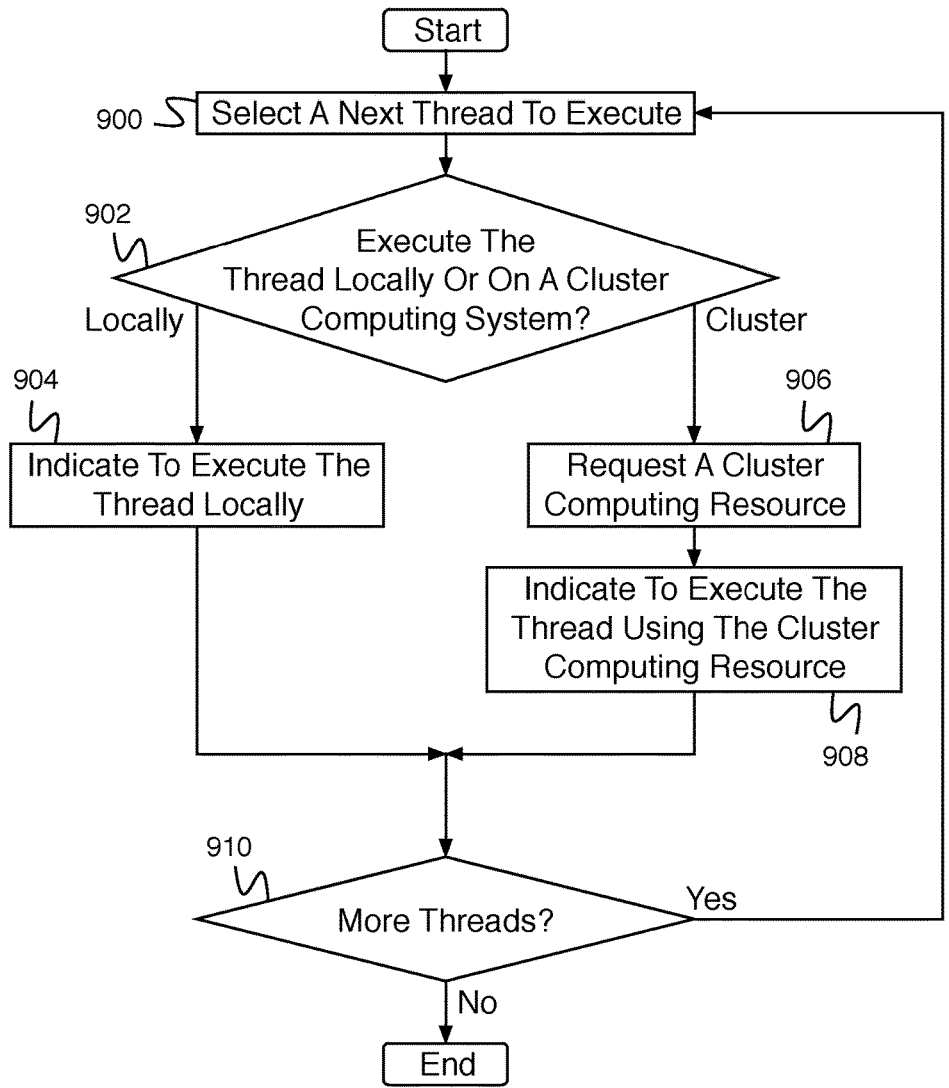
FIG. 9 is a flow diagram illustrating an embodiment of a process for indicating to execute one or more spreadsheet threads to determine spreadsheet calculation results.

FIG. 9 is a flow diagram illustrating an embodiment of a process for indicating to execute one or more spreadsheet threads to determine spreadsheet calculation results. In some embodiments, the process of FIG. 9 implements 606 of FIG. 6. In the example shown, in 900, a next thread to execute is selected. In some embodiments, the next thread comprises a thread of the threads determined in FIG. 8. In some embodiments, the next thread comprises the first thread. In 902, it is determined whether to execute the thread locally or on a cluster computing system. In various embodiments, the determination is based on an availability of a cluster computing system, a cost of a cluster computing system, an expected computation time of the thread, a system setting, or on any other appropriate factor. In the event it is determined to execute the thread locally, control passes to 904. In 904, the process indicates to execute the thread locally. In some embodiments, executing the thread locally comprises executing the thread using a spreadsheet thread executor (e.g., spreadsheet thread executor 212 of FIG. 2). Control then passes to 910. In the event it is determined in 902 to execute the thread on a cluster computing system, control passes to 906. In 906, a cluster computing resource is requested. In some embodiments, the cluster computing resource is requested from a cluster computing system (e.g., cluster computing system 108 of FIG. 1). In some embodiments, a cluster computing resource size is determined based at least in part on a thread size. In 908, the process indicates to execute the thread using the cluster computing resource. Control then passes to 910. In 910, it is determined whether there are more threads to execute. In the event it is determined that there are more threads to execute, control passes to 900. In the event it is determined that there are not more threads to execute, the process ends.

Figure 10:
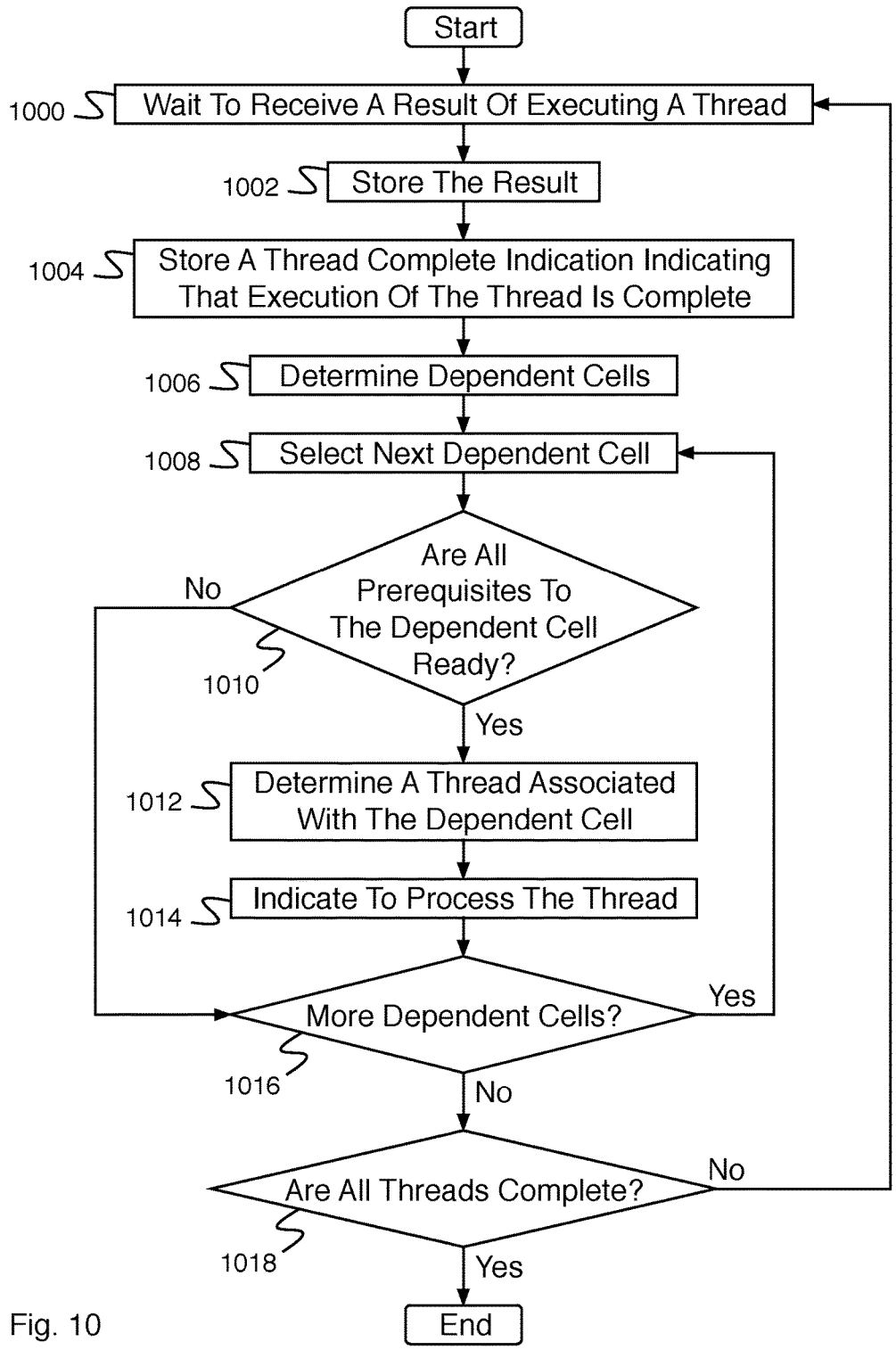
FIG. 10 is a flow diagram illustrating an embodiment of a process for receiving results of executed spreadsheet threads and determining and indicating to process more spreadsheet threads as necessary.

FIG. 10 is a flow diagram illustrating an embodiment of a process for receiving results of executed spreadsheet threads and determining and indicating to process more spreadsheet threads as necessary. In some embodiments, the process of FIG. 10 implements 608 of FIG. 6. In the example shown, in 1000, the process waits to receive the result of executing a thread. In some embodiments, the result of executing a thread is received from a local spreadsheet thread executor (e.g., spreadsheet thread executor 212 of FIG. 2). In some embodiments, the result of executing a thread is received from a cluster computing system (e.g., cluster computing system 108 of FIG. 1). When a result of executing a thread is received, control passes to 1002. In 1002, the result is stored. In 1004, a thread complete indication indicating that execution of the thread is complete. In some embodiments, the thread complete indication is stored in a ready table. In 1006, dependent cells are determined. In some embodiments, dependent cells comprise cells that are dependent on the thread for which the result was received in 1000. In some embodiments, dependent cells are determined from a ready table. In 1008, the next dependent cell is selected. In some embodiments, the next dependent cell comprises the first dependent cell. In 1010, it is determined whether all prerequisites to the dependent cell are ready. In some embodiments, determining whether all prerequisites to the dependent cell are ready comprises checking the ready status of all prerequisites to the dependent cell in the ready table. In the event it is determined that not all prerequisites to the dependent cell are ready, control passes to 1016. In the event it is determined that all prerequisites to the dependent cell are ready, control passes to 1012. In 1012, a thread associated with the dependent cell is determined. In 1014, the process indicates to process the thread. In 1016, it is determined whether there are more dependent cells. In the event it is determined that there are more dependent cells, control passes to 1008. In the event it is determined that there are not more dependent cells, control passes to 1018. In 1018, it is determined whether all threads are complete. In some embodiments, determining whether all threads are complete comprises determining whether all cells are marked as ready in the ready table. In the event it is determined that all threads are not complete, control passes to 1000. In the event it is determined that all threads are complete, the process ends.

Figure 11:
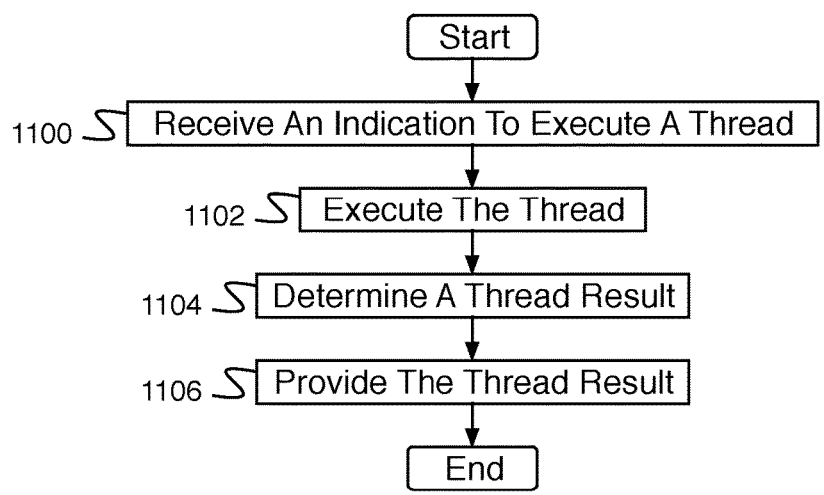
FIG. 11 is a flow diagram illustrating an embodiment of a process for executing a thread.

FIG. 11 is a flow diagram illustrating an embodiment of a process for executing a thread. In some embodiments, the process of FIG. 11 is executed by spreadsheet thread executor 212 of FIG. 2. In some embodiments, the process of FIG. 11 is executed by cluster computing system 108 of FIG. 1. In the example shown, in 1100, an indication to execute a thread is received. In 1102, the thread is executed. In some embodiments, executing the thread comprises performing a calculation. In 1104, a thread result is determined. In some embodiments, a thread result comprises a calculation result. In 1106, the thread result is provided.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for threading spreadsheet calculations, comprising:
    an input interface to receive a request to perform spreadsheet calculations; and
    a processor to:
        determine a data flow graph based at least in part on formulas of a spreadsheet;
        determine a plurality of spreadsheet threads based at least in part on the data flow graph, comprising to:
            determine a first leaf node associated with a first spreadsheet thread and a second leaf node associated with a second spreadsheet thread based on the data flow graph, the plurality of spreadsheet threads including the first spreadsheet thread, and the second spreadsheet thread; and
        indicate to execute the plurality of spreadsheet threads to determine the spreadsheet calculation results, comprising to:
            execute the first spreadsheet thread and the second spreadsheet thread in parallel to determine the spreadsheet calculation results, comprising to:
                in the event that the execution of the first spreadsheet thread has been completed, update a ready table to indicate that the execution of the first spreadsheet thread has been completed;
                in the event that the execution of the second spreadsheet thread has been completed, update the ready table to indicate that the execution of the second spreadsheet thread has been completed; and
                in the event that the ready table indicates that the execution of the first spreadsheet thread and the second spreadsheet thread have been completed, determine that the plurality of spreadsheet threads have been completed.

2. The system of claim 1, wherein the request to perform the spreadsheet calculations comprises a carriage return or enter indication.

3. The system of claim 1, wherein a request to perform spreadsheet calculations comprises an update sheet command.

4. The system of claim 1, wherein the processor is further to provide the spreadsheet calculation results.

5. The system of claim 1, wherein the processor is further to update spreadsheet cells.

6. The system of claim 1, wherein execution of the plurality of spreadsheet threads is performed hierarchically based at least in part on the data flow graph.

7. The system of claim 1, wherein execution of spreadsheet threads is performed in parallel for spreadsheet threads that are independent in the data flow graph.

8. The system of claim 1, wherein the processor is further to execute the plurality of spreadsheet threads.

9. The system of claim 1, wherein the plurality of spreadsheet threads are executed using a parallel processing cluster.

10. The system of claim 1, wherein the processor is further to request resources from a parallel processing cluster.

11. The system of claim 1, wherein determining the data flow graph based at least in part on the formulas of the spreadsheet comprises analyzing the spreadsheet using a list of non-blank cells.

12. The system of claim 1, wherein determining the data flow graph based at least in part on the formulas of the spreadsheet comprises determining referenced cells associated with a formula of the spreadsheet.

13. The system of claim 1, wherein a hierarchy of the data flow graph is based at least in part on the formulas of the spreadsheet.

14. The system of claim 1, wherein the data flow graph is determined at compile time.

15. The system of claim 1, wherein the processor is further to receive a result of executing a spreadsheet thread.

16. The system of claim 15, wherein the processor is further to store the result of executing the spreadsheet thread.

17. The system of claim 15, wherein the processor is further to store a thread complete indication indicating that execution of the spreadsheet thread is complete.

18. The system of claim 1, wherein the processor determines that the spreadsheet calculations are complete in response to a determination that a thread complete indication associated with each spreadsheet thread is stored.

19. The system of claim 1, wherein each row of the ready table corresponds to a cell of the spreadsheet and comprises the thread completion indication for the cell, and a list of dependent cells for the cell.

20. A method for threading spreadsheet calculations, comprising:
  receiving a request to perform spreadsheet calculations;
  determining, using a processor, a data flow graph based at least in part on formulas of a spreadsheet;
  determining a plurality of spreadsheet threads based at least in part on the data flow graph, comprising:
    determining a first leaf node associated with a first spreadsheet thread and a second leaf node associated with a second spreadsheet thread based on the data flow graph, the plurality of spreadsheet threads including the first spreadsheet thread, and the second spreadsheet thread; and
  indicating to execute the plurality of spreadsheet threads to determine the spreadsheet calculation results, comprising:
    executing the first spreadsheet thread and the second spreadsheet thread in parallel to determine the spreadsheet calculation results, comprising:
      in the event that the execution of the first spreadsheet thread has been completed, updating a ready table to indicate that the execution of the first spreadsheet thread has been completed;
      in the event that the execution of the second spreadsheet thread has been completed, updating the ready table to indicate that the execution of the second spreadsheet thread has been completed; and
      in the event that the ready table indicates that the execution of the first spreadsheet thread and the second spreadsheet thread have been completed, determining that the plurality of spreadsheet threads have been completed.

21. A computer program product for threading spreadsheet calculations, the computer program product being embodied in a non-transitory computer readable storage medium and comprising computer instructions for:
  receiving a request to perform spreadsheet calculations;
  determining a data flow graph based at least in part on formulas of a spreadsheet;
  determining a plurality of spreadsheet threads based at least in part on the data flow graph, comprising:
    determining a first leaf node associated with a first spreadsheet thread and a second leaf node associated with a second spreadsheet thread based on the data flow graph, the plurality of spreadsheet threads including the first spreadsheet thread, and the second spreadsheet thread; and
  indicating to execute the plurality of spreadsheet threads to determine the spreadsheet calculation results, comprising:
    executing the first spreadsheet thread and the second spreadsheet thread in parallel to determine the spreadsheet calculation results, comprising:
      in the event that the execution of the first spreadsheet thread has been completed, updating a ready table to indicate that the execution of the first spreadsheet thread has been completed;
      in the event that the execution of the second spreadsheet thread has been completed, updating the ready table to indicate that the execution of the second spreadsheet thread has been completed; and
      in the event that the ready table indicates that the execution of the first spreadsheet thread and the second spreadsheet thread have been completed, determining that the plurality of spreadsheet threads have been completed.

* * * * *